M. E. WING.
LICENSE TAG ATTACHING DEVICE.
APPLICATION FILED MAY 20, 1920.
1,387,090.
Patented Aug. 9, 1921.
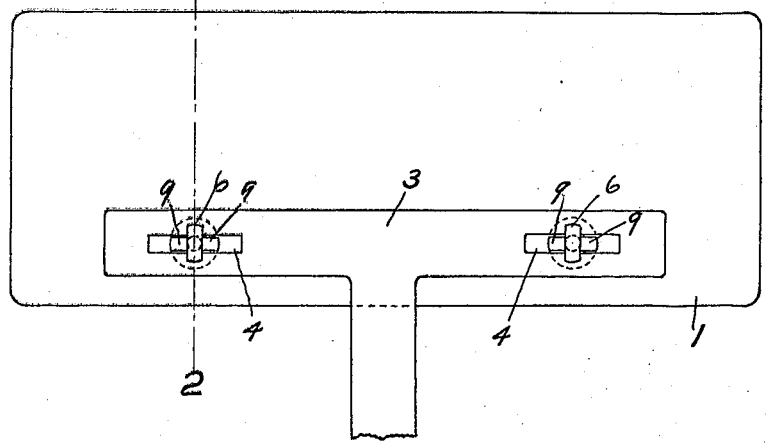
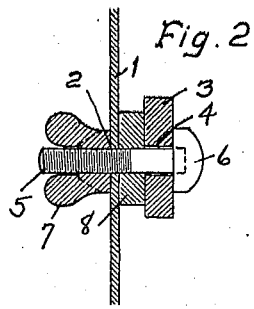
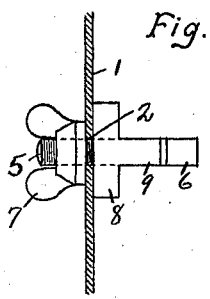
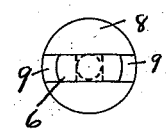
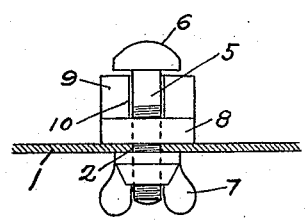
INVENTOR
Maurice E. Wing
By R. Lund
Attorney

UNITED STATES PATENT OFFICE.

MAURICE E. WING, OF LAWRENCE PARK, PENNSYLVANIA.

LICENSE-TAG-ATTACHING DEVICE.

1,387,090. Specification of Letters Patent. Patented Aug. 9, 1921.

Application filed May 20, 1920. Serial No. 382,845.

*To all whom it may concern:*

Be it known that I, MAURICE E. WING, a citizen of the United States, residing at Lawrence Park, in Millcreek township, in the county of Erie and State of Pennsylvania, have invented new and useful Improvements in a License-Tag-Attaching Device, of which the following is a specification.

In securing license tags to automobiles it is desirable to have the bolts so arranged that the tags may be readily removed from one machine and placed on another. This is particularly true for dealers licenses where the shifting of such license tags is very frequent. With the present invention this shift may be made very quickly and the attachment made very secure.

The invention is illustrated in the accompanying drawings as follows:—

Figure 1 shows a rear view of a license tag with its attachment to a bracket.

Fig. 2 a section on the line 2—2 in Fig. 1.

Fig. 3 an end elevation of the attaching bolt arranged for insertion in a bracket.

Fig. 4 an end view of the parts as shown in Fig. 3.

Fig. 5 a plan view of the parts as shown in Fig. 3.

1 marks the license tag. This is provided with the usual perforations 2. 3 marks a bracket having the usual slots 4.

A T head bolt 5 has the head 6 of such size that when turned lengthwise of the slot 4 it will pass through the slot and when turned crosswise of the slot it will engage the bracket at the edges of the slot. The bolt is provided with a nut, preferably a wing nut 7, for clamping the parts together.

A locking device has a plate 8 from which extend the projections 9, the projections being of sufficient length to extend through the bracket 3 and of such thickness as to permit of insertion through the slot 4.

The license tag is placed between the plate 8 and the nut 7. The head 6 is turned to the position shown in Figs. 3 to 5 and in this position it can be inserted through the slot 4. The head 6 is then turned crosswise of the slot 4 and drawn into engagement with the bracket by means of the thumb nut 7. This not only clamps the parts of the bracket but also securely clamps the license tag between the plate 8 and the nut 7. In this operation the head is drawn into the slot 10 between the projections 9 and this locks the head against turning so as to become detached from the bracket by a movement through the slot. Two of these devices are usually used with a bracket as shown in Fig. 1.

What I claim as new is:—

1. A license tag attaching device comprising a slotted bracket; a bolt having a head with one cross dimension greater than the other and one permitting its insertion through the slot and the other preventing its removal through the slot; a lock permitting the head to turn lengthwise of the slot for insertion through the slot and locking the bolt crosswise of the slot after the head is turned and the bolt clamped; and a nut on the opposite side of the bracket from the head, the bracket being unobstructed to permit the insertion and removal of the bolt.

2. A license tag attaching device comprising a slotted bracket; a bolt having a head, said head having one cross dimension greater than the other and one cross dimension adapted to pass through the slot and the other cross dimension greater than the width of the slot; a locking plate having an opening through which the bolt passes and having a projection extending through the slot in the bracket, a part of the projection being adapted to engage the bolt head when turned crosswise of the slot to lock the bolt head in position to engage the bracket; and a nut on the bolt at the opposite side of the bracket, the bracket being unobstructed to permit the insertion and removal of the bolt.

In testimony whereof I have hereunto set my hand.

MAURICE E. WING.